(12) United States Patent
Carrasco et al.

(10) Patent No.: US 12,189,157 B2
(45) Date of Patent: Jan. 7, 2025

(54) SEMI-FINISHED PRODUCT, SECURITY ELEMENT, METHODS OF PRODUCING THEM AND DOCUMENT OF VALUE

(71) Applicant: Giesecke+Devrient Currency Technology GmbH, Munich (DE)

(72) Inventors: Carlos Carrasco, Madrid (ES); Beatriz Cerrolaza, Madrid (ES); Winfried Hoffmüller, Munich (DE); Friedrich Kretschmar, Munich (DE); Denise Schwab, Munich (DE)

(73) Assignee: Giesecke+Devrient Currency Technology GmbH, Munich (DE)

( * ) Notice: Subject to any disclaimer, the term of this patent is extended or adjusted under 35 U.S.C. 154(b) by 0 days.

(21) Appl. No.: 17/877,379

(22) Filed: Jul. 29, 2022

(65) Prior Publication Data

US 2023/0038961 A1 Feb. 9, 2023

(30) Foreign Application Priority Data

Aug. 4, 2021 (EP) ..................................... 21189708

(51) Int. Cl.
*B42D 25/364* (2014.01)
*B42D 25/324* (2014.01)
(Continued)

(52) U.S. Cl.
CPC ........... *G02B 5/287* (2013.01); *B42D 25/324* (2014.10); *B42D 25/351* (2014.10);
(Continued)

(58) Field of Classification Search
CPC .................................................. B42D 25/364
See application file for complete search history.

(56) References Cited

U.S. PATENT DOCUMENTS

| | | | |
|---|---|---|---|
| 2008/0018965 A1* | 1/2008 | Phillips | B42D 25/324 359/2 |
| 2011/0012337 A1* | 1/2011 | Heim | B42D 25/29 428/29 |
| 2014/0232974 A1* | 8/2014 | Tomkins | B42D 25/324 349/127 |

FOREIGN PATENT DOCUMENTS

| | | |
|---|---|---|
| EP | 2 508 358 A1 | 10/2012 |
| EP | 3 321 092 A1 | 5/2018 |

(Continued)

OTHER PUBLICATIONS

EP-3392054-A1 English Translation (Year: 2018).*
(Continued)

*Primary Examiner* — Kyle R Grabowski
(74) *Attorney, Agent, or Firm* — KDW Firm PLLC

(57) ABSTRACT

A semi-finished product method with a liquid crystal security feature includes unrolling and transporting a continuous film in a transporting direction and providing on the film a liquid crystal layer containing a substance whose absorption of polarized light depends on its orientation. The method includes at least one of (A) arranging a lacquer layer on the film and embossing it for a first alignment structure, and at least partly covering it with the liquid crystal layer, the first alignment structure able to cause liquid crystal molecules of the liquid crystal layer to align only in a first direction in first regions and only in a second direction, in second regions, and (B) embossing the liquid crystal layer while the liquid crystal layer is uncured providing a second alignment structure to cause liquid crystal molecules to align only in a third direction in third regions and only in a fourth direction, in fourth regions.

15 Claims, 3 Drawing Sheets

(51) Int. Cl.
 *B42D 25/351*  (2014.01)
 *B42D 25/373*  (2014.01)
 *B42D 25/425*  (2014.01)
 *B42D 25/45*  (2014.01)
 *B42D 25/475*  (2014.01)
 *G02B 5/28*  (2006.01)
 *B42D 25/29*  (2014.01)
 *B42D 25/355*  (2014.01)

(52) U.S. Cl.
 CPC ......... *B42D 25/364* (2014.10); *B42D 25/373* (2014.10); *B42D 25/425* (2014.10); *B42D 25/45* (2014.10); *B42D 25/475* (2014.10); *B42D 25/29* (2014.10); *B42D 25/355* (2014.10)

(56) References Cited

FOREIGN PATENT DOCUMENTS

| | | | | |
|---|---|---|---|---|
| EP | 3392054 A1 * | 10/2018 | ............. | B42D 25/24 |
| EP | 3 466 711 A1 | 4/2019 | | |
| GB | 2 384 318 A | 7/2003 | | |
| WO | WO 2005/029135 A2 | 3/2005 | | |
| WO | WO-2005071497 A1 * | 8/2005 | ........... | G02B 5/1861 |
| WO | WO 2007/079851 A1 | 7/2007 | | |
| WO | WO-2011017749 A1 * | 2/2011 | ............. | B42D 25/29 |
| WO | WO 2011/066991 A2 | 6/2011 | | |
| WO | WO-2019068655 A1 * | 4/2019 | ........... | B42D 25/324 |

OTHER PUBLICATIONS

European Search Report for Application No. 21189708 dated Jan. 13, 2022.
European Patent Office (EPO) Office Action for EP Application No. 21189708.7, dated May 7, 2024, 4 pages.
European Office Action for EP Application No. 21189708.7, dated Oct. 21, 2024, 5 pages.

* cited by examiner

SEMI-FINISHED PRODUCT, SECURITY ELEMENT, METHODS OF PRODUCING THEM AND DOCUMENT OF VALUE

CROSS-REFERENCE TO RELATED APPLICATION

This application claims priority to EP Patent Application No. 21189708.7 filed Aug. 4, 2021, the entire disclosure of which is incorporated by reference herein.

TECHNICAL FIELD

The present invention is directed towards a method for producing a semi-finished product with at least one liquid crystal security feature and a method for producing a security element made from the semi-finished product. Furthermore, the present invention is directed towards the semi-finished product and the security element as such, as well as towards a document of value comprising the security element as a see-through security feature.

BACKGROUND

Processes for producing a two-sided see-through security feature using polymerized liquid crystals are known. In the context of the present invention, the security feature is based on a liquid crystal (LC) layer where the liquid crystal molecules are aligned in a special way. The LC layer contains at least one substance whose orientation depends on the orientation of the molecules of the liquid crystals surrounding them. This substance may be any substance whose absorption of polarized light depends on its orientation in relation to the orientation of the polarization of the incident polarized light, such as a dichroic dye. Thus, the special way of alignment of the liquid crystal molecules in the LC layer exhibits a detailed image in see-through when illuminated by polarized light from behind the LC layer. As there are two sides of the LC layer, the LC alignment can be made such that each side exhibits a different latent image.

Initially, such liquid crystal security features were achieved by using two static plates with structured electrodes oriented in different directions on the plane of the plates. The electric fields have a strong influence on the alignment of liquid crystal molecules, as explained in EP 2 508 358 A1. When voltage is applied to the electrodes, it is possible to manage liquid crystal orientation per plate and LC layer side. This generates an In-Plane-Switching which causes the LC molecules to reorient.

pA static set-up with an electric field or electrostatic charging is not efficient, in particular not for the production of LC layers with identical images on opposite sides thereof. Making use of a roll-to-roll process is a common way of lowering production costs compared to discontinuous processes. To produce such a feature as described above efficiently, the following production steps may be employed, whose production steps generally follow the teaching of EP 3 466 711 A1.

First, suitable mechanical alignment structures are defined to create the LC molecule alignment. These structures can consist of sinusoidal or differently shaped waves with a certain orientation—e.g. parallel to the wave direction—along the surface of the structure within a small region (pixel). An image can then be built from such pixels with different orientations. For providing an optimized black-and-white contrast, the orientation of the structures in the two—black and white—pixel types is typically orthogonal or at least roughly orthogonal. Typically, images are defined in a rectangular shape and the orientation of the alignment structures are either parallel or perpendicular to the image edges.

Second, first alignment structures for a first image are transferred as a relief into an embossing die (origination), from which a first cylindrical tool (replication and sleeve formation) is manufactured. This replication process places the rectangular image to the tool with one of the edges perpendicular to the first cylinder tool's rotation direction—or parallel to the transporting direction. The same process steps are applied to create second alignment structures for a second image using a second cylindrical tool.

Third, a carrier foil is provided with the relief of the first alignment structure of the first image by using the first cylindrical tool—usually by embossing into a transparent lacquer. Such a lacquer may be printed onto the carrier, embossed and e.g. UV-cured for fixing the structures.

Fourth, a printing process may be used to transfer a LC mixture, containing typically one or more dichroic dyes and one or more photoinitiators, to the foil carrier which carries already the first embossed relief structure. Typically, the temperature of the LC mixture is controlled to allow for printing the mixture, i.e. adapting the viscosity of the LC mixture, typically at temperatures above room temperature.

Fifth, the carrier foil covered with said LC layer is brought into contact under pressure with the second cylindrical tool bearing the relief of the second alignment structures of the second image. In addition, the LC layer is caused to harden or cross-link which may be achieved by raising the temperature and/or applying a certain radiation. The temperature must always be controlled during the image creation process so as to enable alignment of the liquid crystal molecules while at the same time keeping the liquid crystal molecules in the liquid crystalline state. This temperature adjustment can be done by e.g. heating the tool and/or heating the carrier foil and/or by external radiation or other means.

While the steps one to five described above are also applicable in the context of the present application, the quality of the images in see-through resulting from liquid crystal layers created by this process is improvable, especially regarding the contrast of such images.

For instance, FIG. 7 shows an image 1 illustrating the alignment structure in different pixel regions of a liquid crystal security feature. The image was produced on a continuous film, wherein the transporting direction of the continuous film is marked by an arrow. The image 1 containing a portrait 5 is pixelated into a plurality of pixels 2. The image 1 has first regions 3, namely some of the pixels, in which the orientation of the liquid crystal molecules is parallel to the transporting direction, and second regions 4, namely other pixels, in which the orientation of the liquid crystal molecules is essentially orthogonal to the transporting direction. One of the first regions 3 and one of the second regions 4 are shown enlarged next to the image 1. When viewed with linearly polarized light, the first regions 3 are visible as bright white (or dark black if the rotational position of the linear polarizer used to inspect the image is turned by 90°), whereas the second regions are visible as black (or white depending on the rotational position of the linear polarizer). However, the second regions 4 are visible with a lower contrast between white and black as compared to the first regions. Thus, altogether the contrast of the portrait 5 when viewed against linearly polarized light can be relatively poor.

SUMMARY

Accordingly, it is an object of this invention to provide a semi-finished product and a security element having a see-through security feature using liquid crystal molecules whose image quality is improved. It is a further object of this invention to provide a document of value comprising the security element and methods of producing the semi-finished product and security element.

These objects are solved by the subject matter disclosed herein. Preferred embodiments are disclosed herein.

1. (First aspect of the invention) A method of producing a semi-finished product with at least one liquid crystal security feature, comprising the steps of:
   unrolling and transporting a continuous film (12) in a transporting direction, and
   providing on the continuous film (12) a liquid crystal layer (14) containing at least one substance whose absorption of polarized light depends on its orientation, such as a dichroic dye,
   wherein the method further comprises at least one of:
      A:—prior to providing the liquid crystal layer (14), arranging a lacquer layer (13) on the continuous film (12),
      embossing the lacquer layer (13) to provide a first alignment structure,
      at least partly covering the embossed lacquer layer (13) with the liquid crystal layer (14), wherein the first alignment structure is arranged to cause liquid crystal molecules of the liquid crystal layer (14) to align only in a first direction in first regions (41) and only in a second direction, which is essentially orthogonal to the first direction, in second regions (43), and
      B:—embossing the liquid crystal layer (14) while the liquid crystal layer is in an uncured state to provide a second alignment structure, wherein the second alignment structure is arranged to cause liquid crystal molecules to align only in a third direction in third regions (51) and only in a fourth direction, which is essentially orthogonal to the third direction, in fourth regions (53),
   wherein at least one of the first direction and the third direction is arranged to deviate from the transporting direction by an angle of between 20° and 70°, preferably between 30° and 60°, especially preferably 45°.

2. (Preferred embodiment) The method according to clause 1, wherein at least one of:
   A: the step of embossing the lacquer layer (13) to provide the first alignment structure is such that the first alignment structure causes liquid crystal molecules of the liquid crystal layer (14) to align in fifth regions (42) having one or more areas in which the liquid crystal molecules are aligned only in the first direction and one or more areas in which the liquid crystal molecules are aligned only in the second direction, and
   B: the step of embossing the liquid crystal layer (14) to provide the second alignment structure is such that the second alignment structure causes liquid crystal molecules of the liquid crystal layer (14) to align in sixth regions (52) having one or more areas in which the liquid crystal molecules are aligned only in the third direction and one or more areas in which the liquid crystal molecules are aligned only in the fourth direction.

3. (Preferred embodiment) The method according to clause 2, wherein at least one:
   A: the step of embossing the lacquer layer (13) to provide the first alignment structure is such that at least two of the fifth regions (42) have a different area ratio of the one or more areas with the liquid crystal molecules aligned in the first direction relative to the one or more areas with the liquid crystal molecules aligned in the second direction and
   B: the step of embossing the liquid crystal layer (14) to provide the second alignment structure is such that at least two of the sixth regions (52) have a different area ratio of the one or more areas with the liquid crystal molecules aligned in the third direction relative to the one or more areas with the liquid crystal molecules aligned in the fourth direction.

4. (Preferred embodiment) The method according to any one of the preceding clauses, wherein each of the regions (41-43, 51-53) forms a pixel of an image.

5. (Preferred embodiment) The method according to any one of the preceding clauses, comprising the step of arranging a metallic layer (18) across a boundary of the liquid crystal layer (14) so as to mask the boundary of the liquid crystal layer (14).

6. (Preferred embodiment) The method according to any one of the preceding clauses, comprising the steps of:
   embossing the lacquer layer (13) to create a relief structure (71) with a relief surface,
   arranging a metallic layer (77) on top of the relief structure (71) so as to follow the relief surface of the relief structure (71) and, thus, form a micro-mirror relief, and/or
   arranging, on top of or below the metallic layer (77), a thin-film interference structure (75, 76) providing a color-shifting effect.

7. (Second aspect of the invention) A method of producing a security element (10; 20; 30), such as a security thread or stripe, comprising the steps of the method of producing a semi-finished product according to any one of the preceding claims and the further step of cutting the semi-finished product along the transporting direction to form sections which each comprise at least one liquid crystal security feature.

8. (Third aspect of the invention) A semi-finished product or a security element (10; 20; 30), such as a security thread or stripe, with at least one liquid crystal security feature, comprising:
   a carrier film (12) made from polymers, wherein the polymers of the carrier film (12) are predominantly oriented in a direction of predominant orientation, and
   a liquid crystal layer (14) having a first surface and a second surface opposite to the first surface, wherein the liquid crystal layer (14) contains at least one substance whose absorption of polarized light depends on its orientation, such as a dichroic dye, and is disposed on the carrier film (12), wherein at least one of:
      A: the liquid crystal layer (14) having a first relief structure (16) on the first surface thereof, wherein liquid crystal molecules of the liquid crystal layer (14) adjacent to the first relief structure (16) are aligned only in a first direction in first regions (41) and only in a second direction, which is essentially orthogonal to the first direction, in second regions (43), and
      B: the liquid crystal layer (14) having a second relief structure (15) on the second surface thereof, wherein liquid crystal molecules of the liquid crystal layer (14) adjacent to the second relief structure (15) are aligned only in a third direction in third regions (51) and only in a fourth direction, which is essentially orthogonal to the third direction, in fourth regions (53),
      wherein at least one of the first direction and the third direction deviates from the direction of predominant orientation by an angle of between 20° and 70°, preferably between 30° and 60°, especially preferably 45°.

9. (Preferred embodiment) The semi-finished product or security element (10; 20; 30) according to clause 8, wherein at least one of:

A: liquid crystals of the liquid crystal layer (14) adjacent to the first relief structure are aligned in fifth regions (42) having one or more areas in which the liquid crystal molecules are aligned only in the first direction and one or more areas in which the liquid crystal molecules are aligned only in the second direction, and B: liquid crystal molecules of the liquid crystal layer (14) adjacent to the second relief structure are aligned in sixth regions (52) having one or more areas in which the liquid crystal molecules are aligned only in the third direction and one or more areas in which the liquid crystal molecules are aligned only in the fourth direction.

10. (Preferred embodiment) The semi-finished product or security element (10; 20; 30) according to clause 9, wherein at least one of:

A: at least two of the fifth regions (42) of the first alignment structure have a different area ratio of the one or more areas with the liquid crystal molecules aligned in the first direction relative to the one or more areas with the liquid crystal molecules aligned in the second direction and B: at least two of the sixth regions (52) of the second alignment structure have a different area ratio of the one or more areas with the liquid crystal molecules aligned in the third direction relative to the one or more areas with the liquid crystal molecules aligned in the fourth direction.

11. (Preferred embodiment) The semi-finished product or security element (10; 20; 30) according to any one of clauses 8 to 10, wherein each of the regions (41-43, 51-53) forms a pixel of an image.

12. (Preferred embodiment) The semi-finished product or security element (10; 20; 30) according to any one of clauses 8 to 11, further comprising a metallic layer (18) masking a boundary of the liquid crystal layer (14).

13. (Preferred embodiment) The semi-finished product or security element (10; 20; 30) according to any one of clauses 8 to 12, further comprising a micro-mirror relief.

14. (Preferred embodiment) The semi-finished product or security element (10; 20; 30) according to clause 13, further comprising, preferably above or below the micro-mirror relief, a thin-film interference element providing a color-shifting effect.

15. (Fourth aspect of the invention) A document of value (100), such as a bank note, comprising a window portion (102), wherein the security element (10; 20; 30) according to any one of clauses 8 to 14 is arranged in or on the document of value (100) such that the at least one liquid crystal security feature thereof is perceptible through the window portion (102).

BRIEF DESCRIPTION OF THE DRAWINGS

Preferred embodiments of the invention will now be described in reference to the accompanying figures.

DETAILED DESCRIPTION

Figure 1:
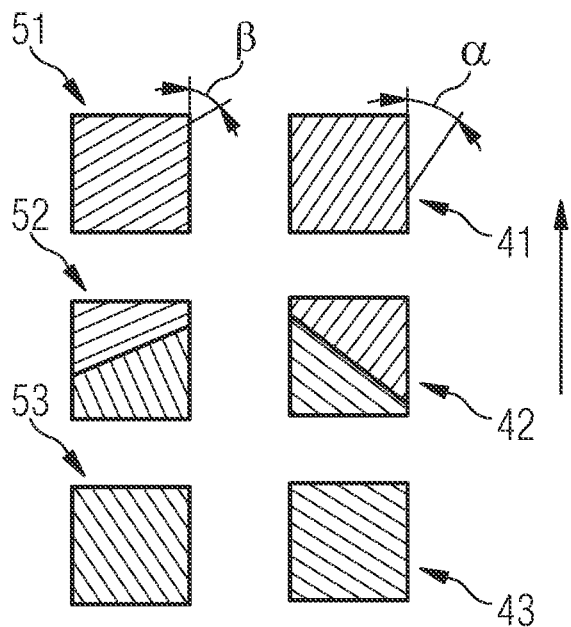
FIG. 1 shows a first pixel region arrangement.

Herein, the term "essentially orthogonal" particularly means an angle of 90°±20°, i.e. an angle in a range of from 70° to 110°.

A first aspect of the invention is directed to a method of producing the semi-finished product with at least one liquid crystal security feature. The method comprises the steps of unrolling and transporting a continuous film in a transporting direction and providing on the continuous film a liquid crystal layer containing at least one substance whose absorption of polarized light depends on its orientation, such as a dichroic dye. The term "continuous film" does not mean that the film is endless. Rather, it refers to long films typically stored on rolls and having a length and a width, wherein the transporting direction is along the length of the film.

The method further comprises one or both of the following alternatives A and B:

In the first alternative A, a lacquer layer is arranged onto the continuous film, before the liquid crystal layer is provided on the continuous film. The lacquer layer is embossed to provide an alignment structure, hereinafter referred to as a first alignment structure. Thereafter, the liquid crystal layer is applied to cover partly or completely the first alignment structure of the lacquer layer. In this process, a (first) relief structure is formed on the lower surface of the liquid crystal layer, while the surface is in contact with the lacquer layer. The (first) relief structure is in register with the first alignment structure of the lacquer layer. The first alignment structure has first regions and second regions which are arranged such that liquid crystal molecules adjacent to the first alignment structure are aligned only in a first direction in the first regions and only in a second direction, which is essentially orthogonal to the first direction, in the second regions.

The second alternative B comprises the step of embossing the top surface of the liquid crystal layer to provide another alignment structure, hereinafter referred to as a second alignment structure, while the liquid crystal layer is in an uncured state. The second alignment structure forms a second relief structure. The second alignment structure comprises third regions and fourth regions which are arranged such that liquid crystal molecules adjacent to the second alignment structure are aligned only in a third direction in the third regions and only in a fourth direction, which is essentially orthogonal to the third direction, in the fourth regions.

Thus, if only the second alternative B is realized, a lacquer layer can be omitted and the liquid crystal layer can be applied directly onto the surface of the carrier film. On the other hand, when the production method comprises both the first alternative A and the second alternative B, the second alignment structure, i.e. the second relief structure, is provided on a surface of the liquid crystal layer opposite to the surface on which the first relief structure is provided. In this scenario, the first and the second alignment structures and, thus, the first and second relief structures are preferably different from each other.

Now, different from the five-step production method described above, at least one of the first direction of the first alignment structure, i.e. of the first relief structure, and the third direction of the second alignment structure, i.e. of the second relief structure, deviates from the transporting direction by an angle of between 20° and 70°, preferably between 30° and 60°, especially preferably 45°. The angle deviation may refer to a clockwise or anti-clockwise direction.

Surprisingly, when viewed in transmission against linearly polarized light, the contrast quality of the images formed adjacent to the first relief structure and second relief structure of the liquid crystal layer, respectively, is much improved as compared to images in which the alignment structures used to create these relief structures are oriented in parallel and orthogonally to the transporting direction.

When analyzing the LC layer which may contain a dichroic dye, it is placed on a screen emitting linearly polarized light typically with the carrier film. Then, when the LC layer is rotated, the two different regions of an image in the LC layer change from rather dark (when the molecules of the dye are in a direction enabling them to absorb light) to rather light (when the dye molecules are in a direction not enabling them to absorb light, i.e. 90° to the former direction). A rotation by 180° completes one full circle from light to dark and dark to light in each region of the image or, in other words, changes the image from positive to negative and back to positive. However, it was observed that in regions where the LC molecules are oriented in the direction of the transporting direction of the film, i.e. in parallel to the transporting direction, the contrast changes from very dark to very light, whereas in those regions where the LC molecules are oriented transverse to the transporting direction of the film, the contrast change was only from dark to light, i.e. exhibiting a substantially lower contrast change between dark and light. This may lead to the conclusion that the film-transporting process promotes some alignment direction to the LC molecules in the regions where the orientation of the alignment structure is parallel to the film-transporting direction which, on the one hand, favors the alignment of the dye molecules in these regions. On the other hand, it hinders the alignment of the dye molecules in those regions where the orientation of the alignment structure is perpendicular to the film-transporting direction. This effect demonstrates that the alignment of LC molecules is more efficient when the alignment structure is tilted a certain angle, preferably 45°, with respect to the transporting direction of the carrier film. This will then allow an optimized alignment of the LC molecules for the two essentially orthogonal orientations in the alignment structure.

Preferably, as regards the first alternative A, the step of embossing the lacquer layer to provide the first alignment structure is such that the first alignment structure further causes liquid crystal molecules of the liquid crystal layer to align in fifth regions having one or more areas in which the liquid crystal molecules are aligned only in the first direction and one or more areas in which the liquid crystal molecules are aligned only in the second direction. Similarly, as regards the second alternative B, the step of embossing the liquid crystal layer to provide the second alignment structure is preferably such that the second alignment structure further causes liquid crystal molecules of the liquid crystal layer to align in sixth regions having one or more areas in which the liquid crystal molecules are aligned only in the third direction and one or more areas in which the liquid crystal molecules are aligned only in the fourth direction. For example, one of the fifth or sixth regions has only two areas, e.g. X and Y. In the area X, all liquid crystal molecules are aligned in the first direction, while in the area Y all liquid crystal molecules are aligned in the second direction which is essentially orthogonal to the first direction.

The fifth regions are perceptible in a halftone or gray color relative to the first and second regions. Similarly, the sixth regions are perceptible in a halftone or gray color relative to the third and fourth regions. For the fifth regions, the tone of the halftone or gray color depends on the area ratio of the one or more areas in which the liquid crystal molecules are aligned only in the first direction relative to the one or more areas in which the liquid crystal molecules are aligned in the second direction. And for the sixth regions, the tone of the halftone or gray color depends on the area distribution of the one or more areas in which the liquid crystal molecules are aligned in the third direction relative to the one or more areas in which the liquid crystal molecules are aligned in the fourth direction.

In other words, in the case of the halftone or gray colors, the alignment structure in each region of the fifth and sixth regions is created in a way that a certain percentage of the LC molecules in the respective region aligns in one direction, i.e. in the first or third direction, while the rest of the LC molecules aligns perpendicular thereto, i.e. in the second or fourth direction. This allows to generate different halftones or gray tones depending on the area distribution in the regions of the first and/or second alignment structures. For example, an area distribution of 50% by 50% would always be gray when illuminated by linearly polarized light, whereas an area distribution of 80% by 20% would show dark gray to rather white depending on the polarized light incidence.

The fifth regions can be understood as a mosaic which is generated by one or more areas on the one hand, in which the liquid crystal molecules are aligned only in the first direction, and by one or more areas on the other hand, in which the liquid crystal molecules are aligned only in the second direction. The sixth regions can be understood as a mosaic which is generated by one or more areas on the one hand, in which the liquid crystal molecules are aligned only in the third direction, and by one or more areas on the other hand, in which the liquid crystal molecules are aligned only in the fourth direction.

Accordingly, in a preferred embodiment, at least two different varieties of the fifth regions in different halftone or gray shades and/or at least two different varieties of the sixth regions in different halftone or gray shades are perceptible. The at least two different varieties of the fifth regions can be generated by embossing the lacquer layer to provide the first alignment structure such that at least two of the fifth regions have a different area ratio of the one or more areas with the liquid crystal molecules aligning in the first direction relative to the one or more areas with the liquid crystal molecules aligning in the second direction. For example, the fifth regions have one variety of regions, in which 50% of the liquid crystal molecules are aligned in the first direction and the other 50% of the liquid crystal molecules are aligned in the second direction, and another variety of regions, in which 30% of the liquid crystal molecules are aligned in the first direction and the other 70% of the liquid crystal molecules are aligned in the second direction. As for the sixth regions, similarly, at least two different varieties thereof can be generated by embossing the liquid crystal layer to provide the second alignment structure such that at least two of the sixth regions have a different area ratio of the one or more areas with the liquid crystal molecules aligning in the third direction relative to the one or more areas with the liquid crystal molecules aligning in the fourth direction.

Preferably, each of the regions, i.e. first to sixth regions, forms a pixel of an image, such as a portrait, architecture and/or landscape image. This way, images can be made of latent image pixels which, when viewed against linearly polarized light, become visible and, when the image is rotated, can change contrast between black and white and, possibly, further pixels can change contrast between dark gray and light gray and/or exhibit a constant gray color.

In a preferred embodiment, a metallic layer is arranged across a boundary of the liquid crystal layer so as to mask the boundary. That is, the liquid crystal layer is applied to the carrier film or to the embossed lacquer layer in liquid form, e.g. using a printing process. But register-accurate printing is difficult, so that unattractive optical effects may occur at the edges of the liquid crystal layer. Also, when embossing the second alignment structure into the surface of the liquid crystal layer while the liquid crystal layer is not yet fully cured and soft, the liquid crystalline mixture may smear and create imperfect boundaries of the liquid crystal layer. Therefore, the metallization arranged across the boundary of the liquid crystal layer has the function of masking the liquid crystal layer when it is printed out of register and/or appears visually unattractive to the viewer. The metallization of the metallic layer may be performed by printing based on metallic pigment ink, preferably containing Al flakes.

Further security features may be provided, e.g. next to the liquid crystal security feature or preferably surrounding the liquid crystal security feature, in order to enhance the visual effect of the liquid crystal security feature. According to a preferred embodiment, a thin-film interference element exhibiting a color-shifting effect, as is known in the art, is provided on the carrier film as a further security feature. The structure of the thin-film interference element may comprise one or more pairs of absorber and dielectric layers superposed in alternating sequence, such as Cr as the absorber layers and $SiO_2$ as the dielectric layers, and a reflector layer as a lowermost layer, such as an Al layer.

As another preferred security feature, a micro-mirror relief may be provided on the carrier film. The micro-mirror relief is a reflective micro-structure in the form of a mosaic of a plurality of (in particular achromatic) reflective mosaic elements, the mosaic elements being characterized by the parameters size, outline shape, relief shape, reflectivity and spatial orientation, as further described in WO 2007/079851 A1 and WO 2011/066991 A2. The lateral dimensions of the mosaic elements are preferably chosen in the range of between 3 μm and 30 μm in order to avoid wavelength dependent light diffraction effects but achieve achromatic reflection of the light by the mosaic elements. The relief structure of the micro-mirror relief may be embossed into the same lacquer layer into which also the first alignment structure for the liquid crystal layer is embossed, however next to the alignment structure. Preferably, the micro-mirror relief forms the reflector layer of the thin-film interference element.

Accordingly, the production method may further comprise the steps of embossing the lacquer layer to create the relief structure with a relief surface, arranging a metallic layer on top of the relief structure so as to follow the relief surface and, thus, form the micro-mirror relief, and/or arranging, preferably on top of or below the metallic layer of the micro-mirror relief, the thin-film interference structure providing the color-shifting effect.

A second aspect of this invention is directed to a method of producing a security element, such as a security thread or stripe. The semi-finished product produced according to any embodiment of the above-mentioned methods comprises a plurality of the liquid crystal security features which are arranged on the continuous film serving as a carrier substrate. The semi-finished product is cut along the transporting direction of the continuous film into a plurality of stripe-like sections, each of which comprising at least one of the liquid crystal security features. The security thread can be embedded in a document of value, such as a bank note, whereas the security stripe can be attached to the surface of a document of value, such as a bank note, either over the whole width of the document or as a shorter patch.

A third aspect of this invention is directed to a semi-finished product or a security element, such as the aforementioned security thread or stripe, with at least one liquid crystal security feature, wherein the semi-finished product or a security element comprises a polymeric carrier film and a liquid crystal layer containing at least one substance whose absorption of polarized light depends on its orientation, such as a dichroic dye, disposed on the carrier film.

The semi-finished product or the security element further comprises at least one of the following alternatives A and B:

In the first alternative A, the liquid crystal layer has a first relief structure on a first surface thereof, wherein liquid crystal molecules of the liquid crystal layer adjacent to the first relief structure are aligned only in a first direction in first regions and only in a second direction, which is essentially orthogonal to the first direction, in second regions. Whereas in the second alternative B, the liquid crystal layer has a second relief structure on a second surface opposite to the first surface, wherein liquid crystal molecules of the liquid crystal layer adjacent to the second relief structure are aligned only in a third direction in third regions and only in a fourth direction, which is essentially orthogonal to the third direction, in fourth regions.

For the reasons already set out above, at least one of the first direction and the third direction deviates by an angle of between 20° and 70° with respect to the length direction of the carrier film, preferably between 30° and 60°, especially preferably 45°. The angle deviation refers to a clockwise and anti-clockwise direction.

Since the polymeric carrier film is typically produced by extrusion and since during the extrusion and subsequent winding on a roll the film is stretched, this causes the polymer molecules in the film to predominantly orient along the stretching direction, i.e. along the length direction of the carrier layer. The predominant orientation of the polymers in the carrier film leads to birefringence which can easily be verified. Thus, with respect to the products resulting from the manufacturing process, namely the semi-finished product or the security element, these can be verified in that at least one of the first direction and the third direction deviates from the direction of predominant orientation of the polymers in the carrier film by an angle of between 20° and 70°, preferably between 30° and 60°, especially preferably 45°. The polymer of the carrier film is preferably polyethylene terephthalate (PET).

When the semi-finished product or the security element comprises both alternatives A and B, the first relief structure preferably differs from the second relief structure so as to create two different images when the product or element is observed from opposite sides against polarized light.

In a preferred embodiment, liquid crystal molecules of the liquid crystal layer adjacent to the first relief structure are aligned in fifth regions having one or more areas in which the liquid crystal molecules are aligned only in the first direction and one or more areas in which the liquid crystal molecules are aligned only in the second direction, and/or liquid crystal molecules of the liquid crystal layer adjacent to the second relief structure are aligned in sixth regions having one or more areas in which the liquid crystal molecules are aligned only in the third direction and one or more areas in which the liquid crystal molecules are aligned only in the fourth direction. As explained above in relation to the production method, the fifth regions and the sixth regions are perceptible in a halftone or gray color as compared to the first and second regions and third and fourth regions, respectively, which may be visible in a rather dark or rather light tone depending on the polarized light incidence.

In an even further preferred embodiment, at least two different varieties of the fifth regions in different halftone or gray shades and/or at least two different varieties of the sixth regions in different halftone or gray shades are perceptible. For instance, at least two of the fifth regions of the first alignment structure may have a different area ratio of the one or more areas with the liquid crystal molecules aligned in the first direction relative to the one or more areas with the liquid crystal molecules aligned in the second direction. Alternatively or in addition, at least two of the sixth regions of the second alignment structure may have a different area ratio of the one or more areas with the liquid crystal molecules aligned in the third direction relative to the one or more areas with the liquid crystal molecules aligned in the fourth direction.

Preferably, each of the regions, i.e. first to sixth regions, forms a pixel of an image, such as a portrait, architecture and/or landscape image or an image of any other motif. When viewed against linearly polarized light, the image becomes visible and, when the image is rotated, changes contrast between black and white and, possibly, some of the pixels change contrast between dark gray and light gray and/or exhibit a constant gray color.

A fourth aspect of the invention is directed to a document of value, such as a bank note, comprising a window portion, wherein the security element as described above is arranged in or on the document of value such that the liquid crystal security feature is perceptible through the window portion. Thus, the liquid crystal security feature of the security element constitutes a see-through feature in the document of value which can be observed from both sides of the document of value against linearly polarized light.

Figure 7:
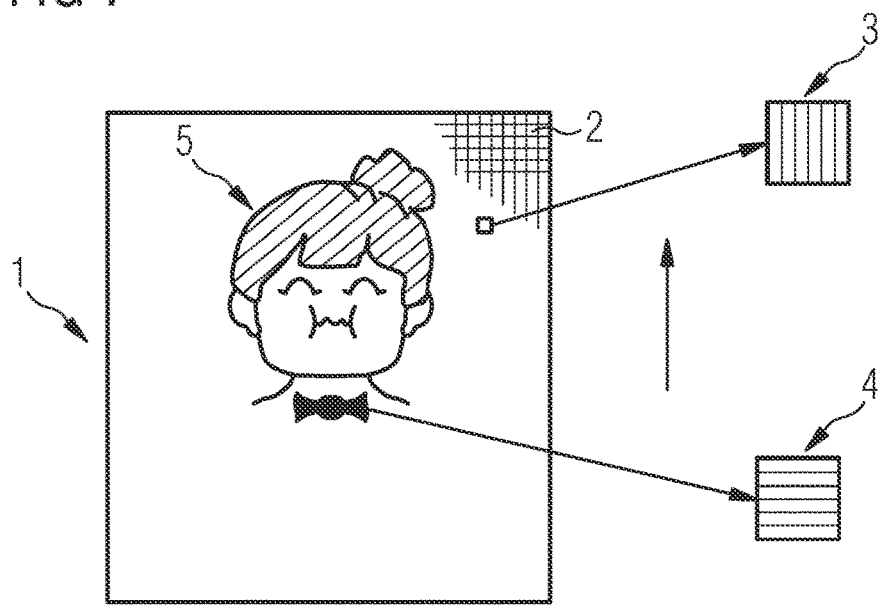
FIG. 7 shows a prior art pixel region arrangement in an image.

An image having different pixel regions in which the liquid crystal molecules of a liquid crystal layer are oriented in respectively different directions has already been described above in relation to FIG. 7. The image is produced in a continuous process on a continuous or endless film. The present invention differs from that technology only in that the orientation of the liquid crystal molecules in the liquid crystal layer is angled in the respective image regions relative to the transporting direction of the continuous film.

FIG. 1 shows a first arrangement of differently structured regions 41, 42 and 43 of the liquid crystal layer according to a first embodiment. Each of the regions 41, 42, 43 forms a pixel of a first image, such as the image shown in FIG. 7. There may be a great number of those regions 41, 42, 43 forming the image. In the first regions 41, i.e. in the respective image pixels, the liquid crystal molecules are aligned only in a first direction which corresponds to the direction of the lines as illustrated in the first region 41 in FIG. 1. The transporting direction of the continuous film during the manufacture of the image is marked with an arrow. The first direction deviates from the transporting direction by an angle α. The angle α is between 20° and 70°, preferably between 30° and 60°, especially preferably 45°. In the second regions 43, i.e. in the respective image pixels, the liquid crystal molecules of the liquid crystal layer are aligned only in a second direction which corresponds to the direction of the lines shown in the second region 43 in FIG. 1, wherein the second direction is essentially orthogonal to the first direction. The other regions 42, i.e. the respective image pixels, have two areas, i.e. an upper right area and a bottom left area in the embodiment shown. Liquid crystal molecules in the upper right area are aligned only in the first direction, whereas liquid crystal molecules in the bottom left area are aligned only in the second direction, as illustrated by the lines in the corresponding region 42 in FIG. 1. The latter regions 42 are hereinafter referred to as "fifth regions". They generate a gray tone, whose gray level depends on the size ratio of the two different areas. In this case, since the two areas of the first and second directions within the fifth regions 42 are of approximately the same size, they will always appear in an identical gray tone under observation against polarized light.

While the first image may be formed by the pixels 41, 42, 43 on a first side of the liquid crystal layer, a second image may be formed on the opposite second side of the liquid crystal layer. The second image may be formed likewise by the first regions 41, second regions 43 and fifth regions 42 or may be formed by differently structured third regions 51, fourth regions 53 and sixth regions 52, respectively. In the third regions 51, i.e. in the respective image pixels of the second image, liquid crystal molecules are aligned only in a third direction which corresponds to the direction of the lines within the third region 51 shown in FIG. 1. The third direction deviates from the transporting direction of the continuous film by an angle β. The angle β may be different from the afore-mentioned angle α and is between 20° and 70°, preferably between 30° and 60°, especially preferably 45°. In the fourth regions 53, i.e. in the respective image pixels, liquid crystal molecules are aligned only in a fourth direction which corresponds to the direction of the lines within the fourth region 53 shown in FIG. 1, wherein the fourth direction is essentially orthogonal to the third direction. The sixth regions 52, i.e. the respective image pixels, have two areas, i.e. the upper right area and the bottom left area shown in FIG. 1. Liquid crystal molecules in the upper left area are aligned only in the third direction, whereas liquid crystal molecules in the bottom right area are aligned only in the fourth direction, as illustrated by the lines in the corresponding region 52 in FIG. 1. The sixth regions 52 generate a gray tone, whose gray level depends on the size ratio of the two different areas. In this case, since the two areas of the third and fourth directions within the sixth regions 52 are of different size, they will change their gray tone under observation against polarized light when the linear polarizer is rotated.

Figure 2:
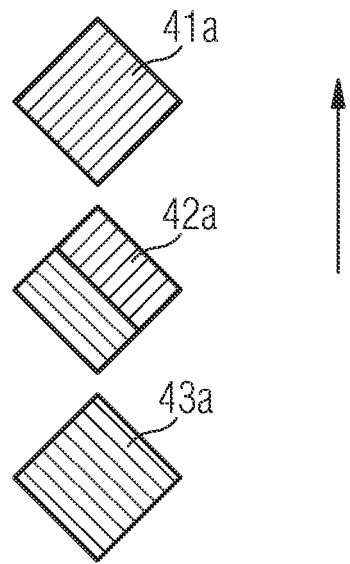
FIG. 2 shows a second pixel region arrangement.

FIG. 2 shows a second arrangement of regions 41a, 42a, 43a, e.g. pixels of an image, the regions differing from the regions 41 to 43 and 51 to 53 of the first arrangement mainly in their outer shape or orientation, respectively. That is, the form of the regions forming the pixels of an image may be selected freely, as well as their orientation and even their relative position. In particular, the regions/pixels need not be arranged along a regular grid pattern but may be arranged irregularly.

The layer structures and manufacturing processes for the production of three different embodiments of a security element or semi-finished product from which the security element may be made will now be described with reference to FIGS. 3 to 5.

Figure 3:
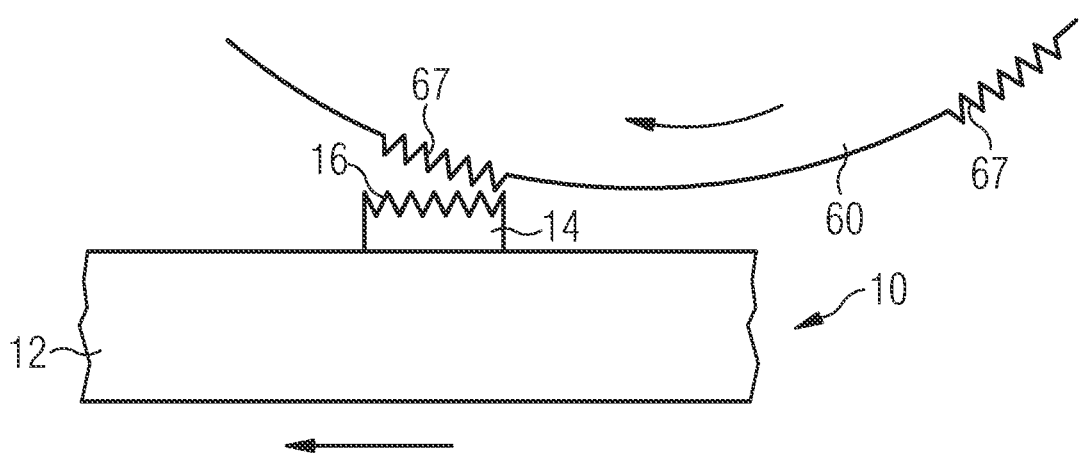
FIG. 3 shows a first embodiment for producing a semi-finished product or security element.

FIG. 3 shows a first embodiment of a manufacturing process of a semi-finished product or security element 10. There is provided a continuous carrier film 12 which may be unrolled from a storage roll. Preferably, the continuous film 12 is made of polyethylene terephthalate (PET). The transporting direction of the carrier film 12 is indicated by an arrow. A liquid crystal layer 14 is printed (not shown) onto the surface of the continuous film 12 to cover at least a part thereof. Thereafter, the liquid crystal layer 14 is embossed using an embossing cylinder 60. The embossing cylinder 60 carries alignment structures in the form of reliefs 67 of which one relief 67 is pressed into the top surface of the liquid crystal layer 14 to create a relief structure 16 on the liquid crystal layer 14, while the liquid crystal layer 14 is still in an uncured and, thus, sufficiently soft state. Thereafter, the liquid crystal layer 14 is cured, e.g. using UV light or e-beam irradiation. Finally, either security elements are cut from the semi-finished product right away or the semi-finished product is rolled onto a storage roll for the security elements to be cut out at a later time. For instance, the continuous film 12 may be slit into security threads or security stripes.

In certain regions of the liquid crystal layer 14, also referred to as "third regions", the liquid crystal molecules of the liquid crystal layer 14 adjacent to the relief structure 16 are aligned only in a certain direction, also referred to as "third direction", whereas in other regions, also referred to as "fourth regions", the liquid crystal molecules adjacent to the relief structure 16 are aligned only in a direction which is essentially orthogonal to the third direction and which is also referred to as "fourth direction". The third and fourth regions are not specifically shown in FIG. 3 and may correspond to the regions 51 and 53 shown in FIG. 1. Further regions 52 as shown in FIG. 1 may also be created in the liquid crystal layer 14. The third direction deviates from the transporting direction of the continuous film 12 by an angle β of between 20° and 70°, preferably between 30° and 60°, especially preferably 45°.

Figure 4:
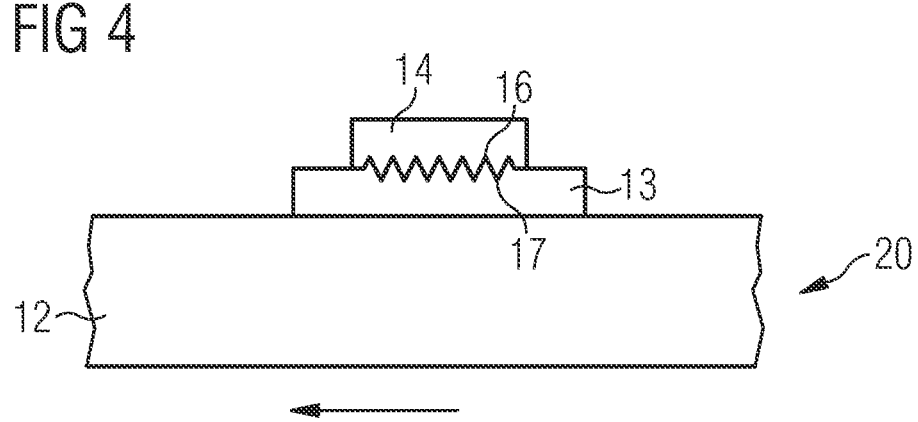
FIG. 4 shows a second embodiment for producing a semi-finished product or security element.

FIG. 4 shows a second embodiment of a manufacturing process of a semi-finished product or security element 20. In this embodiment, a lacquer layer 13 is provided onto the continuous film 12, preferably by printing. Thereafter, a relief structure 17 is embossed into a surface of the lacquer layer 13 using the embossing cylinder 60, as shown in FIG. 3, carrying the reliefs 67. After the lacquer layer 13 has hardened to become sufficiently strong, the liquid crystal layer 14 is provided onto the embossed surface of the lacquer layer 13 to cover at least part of the lacquer layer 13. The relief structure 17 acts as an alignment structure for the liquid crystal molecules in the liquid crystal layer 14. In this process, a relief 16 is formed in the lower surface of the liquid crystal layer 14 while it is in contact with the relief structure 17 of the lacquer layer 13. Thereafter, the liquid crystal layer 14 is cured. (Since the same cylinder 60 as used in the above first embodiment is also used in this second embodiment, the relief 16 in the liquid crystal layer 14 is inverse in the second embodiment as compared to the first embodiment.)

Similarly to what has been described above in relation to FIG. 3, in certain regions of the liquid crystal layer 14, also referred to as "first regions", the liquid crystal molecules of the liquid crystal layer 14 adjacent to the relief structure 16 are aligned only in a certain direction, also referred to as "first direction", whereas in other regions, also referred to as "second regions", the liquid crystal molecules adjacent to the relief structure 16 are aligned only in a direction which is essentially orthogonal to the first direction and which is also referred to as "second direction". The first and second regions are not specifically shown in FIG. 4 and may correspond to the regions 41 and 43 shown in FIG. 1. Further regions 42 as shown in FIG. 1 may also be created in the liquid crystal layer 14 of this second embodiment. The first direction deviates from the transporting direction by an angle α of between 20° and 70°, preferably between 30° and 60°, especially preferably 45°.

Figure 5:
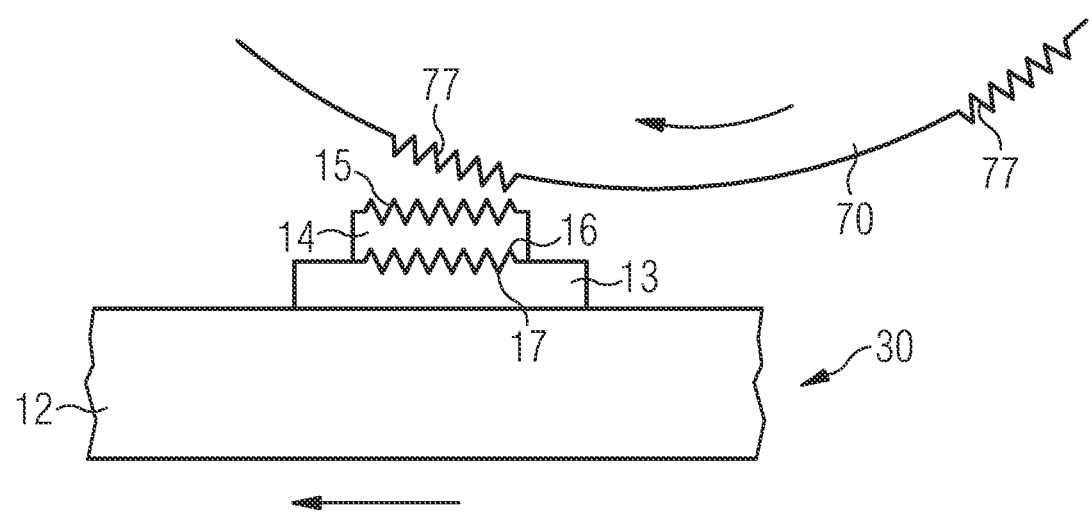
FIG. 5 shows a third embodiment for producing a semi-finished product or security element.

FIG. 5 shows a third embodiment of a manufacturing process of a semi-finished product or security element 30, which is basically a combination of the first and second embodiments described above. First, a lacquer layer 13 is provided onto the continuous film 12, preferably by printing. Thereafter, a relief structure 17 is embossed into the upper surface of the lacquer layer 13 using the embossing cylinder 60, as shown in FIG. 3, carrying the reliefs 67. After the lacquer layer 13 has hardened to become sufficiently strong, the liquid crystal layer 14 is provided onto the embossed surface of the lacquer layer 13 to cover at least part of the lacquer layer 13. This will create a first relief structure 16 in the lower surface of the liquid crystal layer 14 once the liquid crystal layer 14 is cured. So far, the method steps correspond to those described above in relation to the second embodiment with reference to FIG. 4. However, before the liquid crystal layer 14 is cured, a second relief structure 15 is formed in the upper surface of the liquid crystal layer 14 using a second embossing cylinder 70. The second embossing cylinder 70 carries alignment structures in the form of reliefs 77 of which one relief 77 is pressed into the upper surface of the liquid crystal layer 14 to create the second relief structure 15 on the liquid crystal layer 14, while the liquid crystal layer 14 is still in an uncured and, thus, sufficiently soft state. Thereafter, the liquid crystal layer 14 is cured, e.g. using UV light or e-beam irradiation.

Similarly to what has been described above in relation to FIGS. 3 and 4, in first regions adjacent to the lower relief structure 16 of the liquid crystal layer 14 the liquid crystal molecules of the liquid crystal layer 14 are aligned only in the first direction and in second regions the liquid crystal molecules adjacent to the lower relief structure 16 are aligned only in a second direction which is essentially orthogonal to the first direction. Whereas in third regions adjacent to the upper relief structure 15 of the liquid crystal layer 14 the liquid crystal molecules of the liquid crystal layer 14 are aligned only in the third direction and in fourth regions the liquid crystal molecules adjacent to the upper relief structure 15 are aligned only in a fourth direction which is essentially orthogonal to the third direction. The first and second regions are not specifically shown in FIG. 5 and may correspond to the regions 41 and 43 shown in FIG. 1. Further fifth regions 42 as shown in FIG. 1 may also be created in the lower relief structure 16 of the liquid crystal layer 14. Also the third and fourth regions are not specifically shown in FIG. 5 and may correspond to the regions 51 and 53 shown in FIG. 1. Further sixth regions 52 as shown in FIG. 1 may also be created in the upper relief structure 15 of the liquid crystal layer 14. The first and third directions deviate from the transporting direction by an angle α and β, respectively, of between 20° and 70° of the continuous film 12, preferably between 30° and 60°, especially preferably 45°. The visual appearance of the first to third regions is different from the visual appearance of the fourth to sixth regions due to a choice of different outer contours of the regions, the relative arrangement of the regions and/or the alignments of the liquid crystals in the respective regions.

The liquid crystal security feature as shown in FIG. 5 is a see-through security feature which exhibits different visual effects when observed from opposite sides of the carrier film, whereas the liquid crystal security features as shown in FIGS. 3 and 4 represent see-through features which exhibit only a single visual effect.

Figure 6:
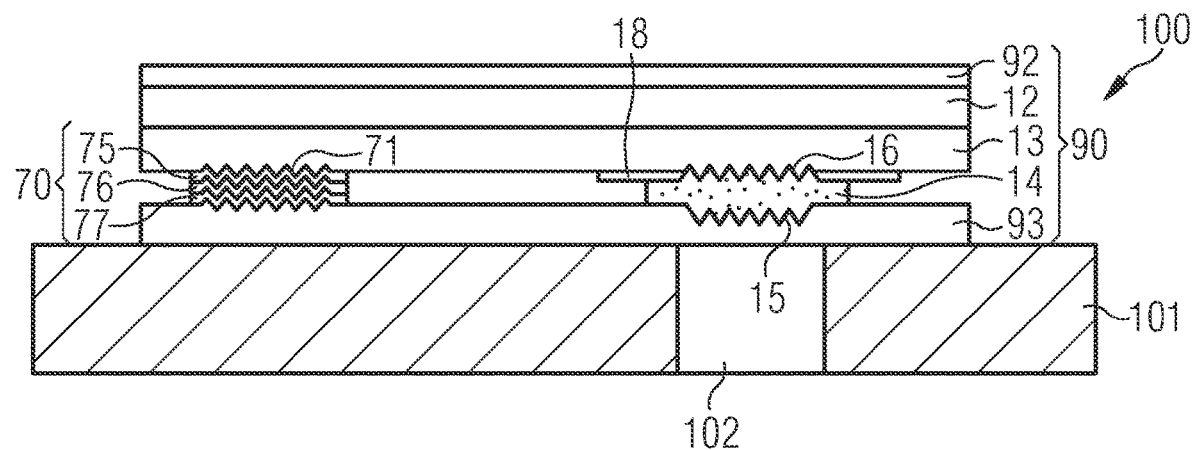
FIG. 6 shows a schematic cross-sectional view of a document of value comprising a window portion and a security element covering the window portion.

FIG. 6 shows a schematic view of a document of value 100 comprising a security element 90 which includes a see-through liquid crystal security feature having the structure according to the third embodiment described in reference to FIG. 5. Thus, the security element 90 comprises the carrier film 12, which is preferably a PET film, the lacquer layer 13 and the liquid crystal layer 14 with a dichroic dye and with the first relief structure 16 and the second relief structure 15 on its opposite surfaces. Alternatively or in addition, the security element 90 may include one or more see-through security features having a structure according to the first and second embodiments described in reference to FIGS. 3 and 4.

Further, a masking layer 18 is provided masking the boundary of the liquid crystal layer 14. The masking layer 18 is preferably a deposited metal or a printed metallic ink and is applied to the lacquer layer 13 (or to the carrier substrate 12 in the case of the first embodiment described in reference to FIG. 3) prior to the application of the liquid crystal layer 14. The masking layer 18 hides the boundary of the liquid crystal layer 14 from the view of an observer so that it is of no importance when it is printed out of register and would therefore appear visually unattractive to the observer.

The security element 90 further comprises a thin-film interference structure 70 providing a color-shifting effect. The thin-film interference structure 70 may comprise an alternating sequence of Cr layers 75 as absorber layers and $SiO_2$ layers 76 as dielectric layers, and it comprises a lowermost reflector layer 77, which may be an Al layer. The layers 75 to 77 of the thin-film interference structure 70 are applied, e.g. through vapor deposition, onto a relief structure 71 which is embossed in the same lacquer layer 13 on which the liquid crystal layer 14 is arranged. The relief structure 71 together with the reflector layer 77 forms a micro-mirror relief which is a reflective micro-structure in the form of a mosaic of a plurality of reflective mosaic elements, as already explained above. The reflector layer 77 of the thin-film interference structure 70 and the masking layer 18 masking the boundary of the liquid crystal layer 14 are preferably applied in one process. While the thin-film interference structure 70 is shown in FIG. 6 as being spaced apart from the see-through liquid crystal interference structure, this is only for ease of explanation. Preferably, they are arranged adjacent to each other, more preferably in a manner in which the thin-film interference structure 70 surrounds the see-through liquid crystal interference structure.

As shown in FIG. 6, the security element 90 is applied onto a surface of a substrate 101 of the document of value 100. In the case of bank notes, the substrate 101 is made from cotton paper or sometimes from plastic or sometimes even from a combination of plastic and paper layers. The substrate 101 has a window portion 102 over which the security element is arranged so that the see-through liquid crystal security feature of the security element 90 is observable from opposite sides of the document of value 100 through the window 102. While the window 102 is shown here as having the form of a through hole, the window portion 102 may alternatively be formed by a transparent region of the substrate 101. Also, the security element may be embedded completely or at least partly inside the substrate 101, such as a security thread, or it may be applied as a security stripe or patch onto the surface of the substrate 101, as is the case here.

The liquid crystal security feature is not initially visually apparent to the viewer when viewed in transmitted light, either from the front or the back side of the document 100. Only when the viewer holds the document 100 against e.g. the display of a cell phone or notebook or observes the document 100 through a linear polarizer does the viewer perceive hidden information. In the case that the first relief structure 16 is different from the second relief structure 15, the front-side hidden information is different from the back-side hidden information, accordingly, which means that the viewer perceives different information when looking at the front side of the document, on the one hand, and when looking at the back side of the bank note, on the other hand, against polarized light.

The security element 90 further includes an adhesive layer 93 on its lower side for fixing the security element 90 to the substrate 101 of the document of value 100. Furthermore, an ink adhesion layer 92 is provided on the exposed (top) surface of the security element 90 which allows for overprinting parts of the security element 90 when the document of value 100 is provided with printings.

The invention claimed is:

1. A method of producing a semi-finished product with at least one liquid crystal security feature, comprising:
   unrolling and transporting a continuous film in a transporting direction; and
   providing on the continuous film a liquid crystal layer containing at least one substance whose absorption of polarized light depends on its orientation;
   prior to providing the liquid crystal layer, arranging a lacquer layer on the continuous film,
   embossing the lacquer layer to provide a first alignment structure,
   at least partly covering the embossed lacquer layer with the liquid crystal layer, wherein the first alignment structure is arranged to cause liquid crystal molecules of the liquid crystal layer to align in different directions in different ones of a plurality of regions of the liquid crystal layer, the plurality of regions comprising:
      one or more first regions in which the liquid crystal molecules align only in a first direction;
      one or more second regions in which the liquid crystal molecules align only in a second direction, which is essentially orthogonal to the first direction; and
      one or more third regions including one or more first areas in which the liquid crystal molecules are aligned only in the first direction and one or more second areas in which the liquid crystal molecules are aligned only in the second direction;
      wherein each of the plurality of regions forms a pixel of an image in which, when viewed with linearly polarized light, the one or more first regions are perceptible with a change in contrast with respect to the one or more second regions, and the one or more third regions are perceptible in a halftone relative to the one or more first regions and the one or more second regions; and
   wherein the first direction is arranged to deviate from the transporting direction by an angle of between 20° and 70°, an angle of between 30° and 60°, or an angle of 45;
   wherein embossing the lacquer layer to provide the first alignment structure is such that at least two of the one or more third regions have a different area ratio of the one or more first areas with the liquid crystal molecules aligned in the first direction relative to the one or more second areas with the liquid crystal molecules aligned in the second direction; and wherein the at least two of the one or more third regions are perceptible in different halftone tones relative to the one or more first regions and the one or more second regions.

2. The method according to claim 1, comprising arranging a metallic layer across a boundary of the liquid crystal layer to mask the boundary of the liquid crystal layer.

3. The method according to claim 1, comprising:
embossing the lacquer layer to create a relief structure with a relief surface;
arranging a metallic layer on top of the relief structure to follow the relief surface of the relief structure and, thus, form a micro-mirror relief; and/or
arranging, on top of or below the metallic layer, a thin-film interference structure providing a color-shifting effect.

4. The method according to claim 1, comprising embossing the liquid crystal layer while the liquid crystal layer is in an uncured state to provide a second alignment structure, wherein the second alignment structure is arranged to cause liquid crystal molecules to align only in a third direction in third regions and only in a fourth direction, which is essentially orthogonal to the third direction, in fourth regions;
wherein the third direction is arranged to deviate from the transporting direction by an angle of between 20° and 70°, an angle of between 30° and 60°, or an angle of 45°.

5. The method according to claim 4, comprising embossing the liquid crystal layer to provide the second alignment structure is such that the second alignment structure causes liquid crystal molecules of the liquid crystal layer to align in fourth regions having one or more areas in which the liquid crystal molecules are aligned only in the third direction and one or more areas in which the liquid crystal molecules are aligned only in the fourth direction.

6. The method according to claim 5, comprising embossing the liquid crystal layer to provide the second alignment structure is such that at least two of the fourth regions have a different area ratio of the one or more areas with the liquid crystal molecules aligned in the third direction relative to the one or more areas with the liquid crystal molecules aligned in the fourth direction.

7. A method of producing a security element, or a security thread or stripe, comprising the method of producing a semi-finished product according to claim 1 and the further comprising cutting the semi-finished product along the transporting direction to form sections which each comprise at least one liquid crystal security feature.

8. A semi-finished product or a security element, or a security thread or stripe, with at least one liquid crystal security feature, comprising:
a carrier film made from polymers, wherein the polymers of the carrier film are predominantly oriented in a direction of predominant orientation;
a lacquer layer disposed on the carrier film and having a first alignment structure; and
a liquid crystal layer having a first surface and a second surface opposite to the first surface, wherein the liquid crystal layer contains at least one substance whose absorption of polarized light depends on its orientation, and is disposed on the lacquer layer;
wherein liquid crystal molecules of the liquid crystal layer are caused by the first alignment structure to be aligned in different directions in different ones of a plurality of regions of the liquid crystal layer, the plurality of regions comprising:
one or more first regions in which the liquid crystal molecules align only in a first direction;
one or more second regions in which the liquid crystal molecules align only in a second direction, which is essentially orthogonal to the first direction; and
one or more third regions including one or more first areas in which the liquid crystal molecules are aligned only in the first direction and one or more second areas in which the liquid crystal molecules are aligned only in the second direction;
wherein each of the plurality of regions forms a pixel of an image in which, when viewed with linearly polarized light, the one or more first regions are perceptible with a change in contrast with respect to the one or more second regions, and the one or more third regions are perceptible in a halftone relative to the one or more first regions and the one or more second regions;
wherein at least two of the one or more third regions of the first alignment structure have a different area ratio of the one or more first areas with the liquid crystal molecules aligned in the first direction relative to the one or more second areas with the liquid crystal molecules aligned in the second direction; and
wherein the at least two of the one or more third regions are perceptible in different halftone tones relative to the one or more first regions and the one or more second regions; and
wherein the first direction deviates from a direction of predominant orientation by an angle of between 20° and 70°, an angle of between 30° and 60°, or an angle of 45°.

9. The semi-finished product or security element according to claim 8, further comprising a metallic layer masking a boundary of the liquid crystal layer.

10. The semi-finished product or security element according to claim 8, further comprising a micro-mirror relief.

11. The semi-finished product or security element according to claim 10, further comprising, above or below the micro-mirror relief, a thin-film interference element providing a color-shifting effect.

12. The semi-finished product or security element according to claim 8, wherein the liquid crystal layer having a second relief structure on the second surface thereof, wherein liquid crystal molecules of the liquid crystal layer adjacent to the second relief structure are aligned only in a third direction in third regions and only in a fourth direction, which is essentially orthogonal to the third direction, in fourth regions; and
wherein the third direction deviates from a direction of predominant orientation by an angle of between 20° and 70°, an angle of between 30° and 60°, or an angle of 45°.

13. The semi-finished product or security element according to claim 12, wherein liquid crystal molecules of the liquid crystal layer adjacent to the second relief structure are aligned in fourth regions having one or more areas in which the liquid crystal molecules are aligned only in the third direction and one or more areas in which the liquid crystal molecules are aligned only in the fourth direction.

14. The semi-finished product or security element according to claim 13, wherein at least two of the fourth regions of the second alignment structure have a different area ratio of the one or more areas with the liquid crystal molecules aligned in the third direction relative to the one or more areas with the liquid crystal molecules aligned in the fourth direction.

15. A document of value or a bank note, comprising a window portion, wherein the security element according to claim 8 is arranged in or on the document of value such that the at least one liquid crystal security feature thereof is perceptible through the window portion.

* * * * *